US012057258B2

(12) United States Patent
Yoshioka et al.

(10) Patent No.: US 12,057,258 B2
(45) Date of Patent: Aug. 6, 2024

(54) INDUCTOR ARRAY COMPONENT AND INDUCTOR ARRAY COMPONENT BUILT-IN SUBSTRATE

(71) Applicant: Murata Manufacturing Co., Ltd., Kyoto-fu (JP)

(72) Inventors: Yoshimasa Yoshioka, Nagaokakyo (JP); Akinori Hamada, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 18/466,213

(22) Filed: Sep. 13, 2023

(65) Prior Publication Data

US 2023/0420180 A1 Dec. 28, 2023

Related U.S. Application Data

(62) Division of application No. 17/076,142, filed on Oct. 21, 2020, now Pat. No. 11,783,994.

(30) Foreign Application Priority Data

Oct. 24, 2019 (JP) ................................ 2019-193664

(51) Int. Cl.
*H01F 27/32* (2006.01)
*H01F 17/00* (2006.01)
(Continued)

(52) U.S. Cl.
CPC ....... *H01F 27/324* (2013.01); *H01F 17/0013* (2013.01); *H01F 17/04* (2013.01);
(Continued)

(58) Field of Classification Search
CPC .... H01F 27/324; H01F 17/0013; H01F 17/04; H01F 27/2823; H01F 27/292; H01F 2017/0066; H01F 2017/048
See application file for complete search history.

(56) References Cited

U.S. PATENT DOCUMENTS

2015/0084731 A1* 3/2015 Takagi .................... H01F 19/08 336/212
2016/0035476 A1* 2/2016 Mimura ................ H01F 41/046 336/199

(Continued)

FOREIGN PATENT DOCUMENTS

CN 107818864 A 3/2018
JP 2004-319875 A 11/2004

(Continued)

OTHER PUBLICATIONS

An Office Action; “Notice of Reasons for Refusal,” mailed by the Japanese Patent Office on Apr. 19, 2022, which corresponds to Japanese Patent Application No. 2019-193664 and is related to U.S. Appl. No. 17/076,142 with English language translation.

*Primary Examiner* — Malcolm Barnes

(74) *Attorney, Agent, or Firm* — Studebaker & Brackett PC

(57) ABSTRACT

An inductor array component includes a substantially flat plate-shaped main body including a magnetic layer having resin and metal magnetic powder contained in the resin, a first inductor wiring and a second inductor wiring disposed on the same plane in the main body and adjacent to each other, and a plurality of first vertical wirings extending in a first direction of a normal direction with respect to the plane so as to penetrate through inside of the main body and being exposed on a side of a first main surface of the main body. Also, the inductor array component includes a plurality of second vertical wirings extending in a second direction of the normal direction with respect to the plane so as to penetrate through the inside of the main body and being exposed on a side of a second main surface of the main body.

19 Claims, 9 Drawing Sheets

(51) Int. Cl.

| | |
|---|---|
| ***H01F 17/04*** | (2006.01) |
| ***H01F 27/28*** | (2006.01) |
| ***H01F 27/29*** | (2006.01) |

(52) U.S. Cl.

CPC ....... *H01F 27/2823* (2013.01); *H01F 27/292* (2013.01); *H01F 2017/0066* (2013.01); *H01F 2017/048* (2013.01)

(56) References Cited

U.S. PATENT DOCUMENTS

| | | | | |
|---|---|---|---|---|
| 2017/0006704 | A1* | 1/2017 | Yoshioka | H01F 5/003 |
| 2017/0098997 | A1* | 4/2017 | Hamada | G06F 1/1635 |
| 2017/0169930 | A1* | 6/2017 | Kudo | H01F 17/0013 |
| 2017/0200554 | A1* | 7/2017 | Kudo | H01F 27/36 |
| 2017/0207020 | A1* | 7/2017 | Hamada | H01F 17/0033 |
| 2017/0213639 | A1* | 7/2017 | Kudo | H01F 27/366 |
| 2017/0345551 | A1* | 11/2017 | Yoshioka | H01F 17/04 |
| 2018/0075965 | A1* | 3/2018 | Yoshioka | H01F 27/2823 |
| 2019/0066900 | A1* | 2/2019 | Nakajima | H01F 41/041 |

FOREIGN PATENT DOCUMENTS

| | | | | | |
|---|---|---|---|---|---|
| JP | 2009-099572 | A | | 5/2009 | |
| JP | 2009099572 | A | * | 5/2009 | H01F 17/0013 |
| JP | 2014-197590 | A | | 10/2014 | |
| JP | 2016-032050 | A | | 3/2016 | |
| JP | 2017-069523 | A | | 4/2017 | |
| JP | 2017-107971 | A | | 6/2017 | |
| JP | 2018-046051 | A | | 3/2018 | |
| JP | 2019-046993 | A | | 3/2019 | |
| JP | 2019-075537 | A | | 5/2019 | |
| JP | 2019-134141 | A | | 8/2019 | |

* cited by examiner

INDUCTOR ARRAY COMPONENT AND INDUCTOR ARRAY COMPONENT BUILT-IN SUBSTRATE

CROSS-REFERENCE TO RELATED APPLICATION

This application is a Divisional of U.S. patent application Ser. No. 17/076,142, filed Oct. 21, 2020, which claims benefit of priority to Japanese Patent Application No. 2019-193664, filed Oct. 24, 2019, the entire content of which is incorporated herein by reference.

BACKGROUND

Technical Field

The present disclosure relates to an inductor array component and an inductor array component built-in substrate.

Background Art

As an existing inductor component built-in substrate, there is a substrate described in Japanese Unexamined Patent Application Publication No. 2004-319875. The inductor component built-in substrate includes an inductor component having a winding structure and a substrate in which the inductor component is embedded. The coil diameter of a winding of the inductor component is parallel to the thickness direction of the substrate.

Further, Japanese Unexamined Patent Application Publication No. 2014-197590 discloses an inductor component including an inductor wiring wound in a substantially planar shape, and a first magnetic layer and a second magnetic layer located at positions sandwiching the inductor wiring from both sides in a normal direction of a plane on which the inductor wiring is wound. The outer shape of the inductor component is a substantially rectangular parallelepiped, and has an upper surface and a lower surface that are perpendicular to the normal direction and four side surfaces that are parallel to the normal direction. The inductor is a surface mounting-type chip component, and the inductor wiring is connected to an outer electrode with an extended portion (terminal electrode+extended electrode) connected to an outer circumferential end of the inductor wiring interposed therebetween. The extended portion is exposed to the outside from the above-described side surface and the outer electrode is exposed to the outside from the above-described upper surface to configure a substantially L-shaped external terminal.

SUMMARY

As the inductor component is miniaturized and reduced in height, three-dimensional mounting of the inductor component employing a system in package (SiP) technology, a package on package (PoP) technology, or the like as well as the existing surface mounting is studied. For example, by embedding the inductor component in a substrate, it is possible to reduce the size and the thickness of a whole system. However, in the inductor built-in substrate disclosed in Japanese Unexamined Patent Application Publication No. 2004-319875, it is difficult to maintain characteristics of the inductor component when the substrate is reduced in thickness because the inductor component has the winding structure and the coil diameter of the winding is parallel to the thickness direction of the substrate.

Therefore, it is conceivable to embed the inductor component disclosed in Japanese Unexamined Patent Application Publication No. 2014-197590 in a substrate such that the plane on which the inductor wiring is wound and the thickness direction of the substrate are orthogonal to each other. This makes it possible to reduce influences on the characteristics of the inductor component by reduction in the thickness of the substrate.

On the other hand, the inductor component disclosed in Japanese Unexamined Patent Application Publication No. 2014-197590 assumes surface mounting, and it cannot be said that the inductor component has a configuration supporting three-dimensional mounting. For example, in the inductor component disclosed in Japanese Unexamined Patent Application Publication No. 2014-197590, the inductor wiring is once extended to the side of the side surface of the inductor component (in the direction along the plane on which the inductor wiring is wound=the main surface direction of the substrate) by the extended portion and is then connected to the external terminal. This assumes that in the surface mounting, a wiring pattern of the substrate is connected to the inductor component from the side of the side surface along the main surface of the substrate. On the other hand, in the three-dimensional mounting, the wiring pattern of the substrate is connected to the inductor component from the upper surface side or the lower surface side. When the inductor wiring is once extended to the side of the side surface as in the inductor component disclosed in Japanese Unexamined Patent Application Publication No. 2014-197590, the wiring pattern once bypasses to the side of the side surface of the inductor component, and then, is connected to the inductor wiring, resulting in generation of unnecessary wiring routing.

In addition to the inductor component with the substantially L-shaped external terminal as disclosed in Japanese Unexamined Patent Application Publication No. 2014-197590, in surface mounting-type inductor components including a bottom electrode-type inductor component in which external terminals are exposed from only the upper surface or the lower surface, and the like, the external terminals are basically disposed to be closer to the sides of the side surfaces. The external terminals are disposed in this manner because in the surface mounting, the inductor component is solder-mounted on the substrate and a gap between the external terminals is therefore widened as much as possible so as to prevent short circuit between the electrodes due to spreading out of the solder. In the three-dimensional mounting, connection between the inductor component and the wiring pattern of the substrate is not limited to the solder mounting. Therefore, the widened gap between the external terminals may lead to unnecessary wiring routing.

Accordingly, the present disclosure provides an inductor array component and an inductor array component built-in substrate capable of improving the degree of freedom in circuit design while supporting three-dimensional mounting.

According to a one embodiment of the present disclosure, an inductor array component includes a substantially flat plate-shaped main body including a magnetic layer having resin and metal magnetic powder contained in the resin; a first inductor wiring and a second inductor wiring disposed on the same plane in the main body and adjacent to each other; and a plurality of first vertical wirings extending from sides of a first end and a second end of the first inductor wiring and sides of a first end and a second end of the second inductor wiring, respectively, in a first direction of a normal direction with respect to the plane so as to penetrate through inside of the main body and being exposed on a side of a first main surface of the main body. The inductor array component further includes a plurality of second vertical wirings extending from the sides of the first end and the second end of the first inductor wiring and the sides of the first end and the second end of the second inductor wiring, respectively, in a second direction of the normal direction with respect to the plane so as to penetrate through the inside of the main body and being exposed on a side of a second main surface of the main body.

With the inductor array component according to the present disclosure, the first and second vertical wirings are extended to the first and second inductor wirings in the first direction and the second direction, so that the degree of freedom in connection with the wirings is improved.

In the inductor array component, it is preferable that a pair of one of the plurality of the first vertical wirings and one of the plurality of the second vertical wirings extending from a same position of the first inductor wiring or the second inductor wiring has a common axis extending in center axes thereof.

Here, the phrase, have a common axis, includes not only the case where the center axes completely overlap each other but also the case where the center axes substantially overlap each other. More specifically, even when the center axes deviate from each other by about 10% of the width of the first and second vertical wirings, it is considered that they have a common axis while the deviation is regarded as manufacturing variations.

According to the embodiment, since the center axes of the first vertical wirings and the second vertical wirings as pairs have a common axis, physical and electrical differences between the front and back sides of the inductor array component can be reduced.

In the inductor array component, it is preferable that a pair of one of the plurality of the first vertical wirings and one of the plurality of the second vertical wirings extending from a same position of the first inductor wiring or the second inductor wiring has cross-sectional areas different from each other.

The cross-sectional area means the area of a cross section orthogonal to the direction in which each vertical wiring extends.

According to the embodiment, the first and second vertical wirings to be connected can be selected according to the densities of currents flowing through the inductor wirings. Therefore, it is not necessary for the vertical wirings to have a uniform cross-sectional area. By reducing the cross-sectional areas of some vertical wirings to increase the volume of the magnetic layer therearound, it is possible to improve inductance with the same component outer shape.

In the inductor array component, it is preferable that a non-magnetic insulating layer covering at least a part of the first inductor wiring and the second inductor wiring be further included.

According to the embodiment, insulating properties of the first inductor wiring and the second inductor wiring can be improved.

In the inductor array component, it is preferable that the insulating layer contain at least one of epoxy-based resin, phenol-based resin, polyimide-based resin, acryl-based resin, and vinyl ether-based resin.

According to the embodiment, insulating organic resin is used for the insulating layer, whereby close contact force between the inductor wirings and the magnetic layer can be improved. Further, the insulating layer is softer than that in the case where an inorganic material is used for the insulating layer. Therefore, the inductor array component can have flexibility, and mechanical strength and resistance to thermal shock can be improved.

In the inductor array component, it is preferable that at least one of the plurality of first vertical wirings and the plurality of second vertical wirings include a via conductor extending in the normal direction from the first end or the second end of the first inductor wiring or the second inductor wiring and penetrating through inside of the insulating layer and a columnar wiring extending in the normal direction from the via conductor and penetrating through inside of the magnetic layer.

According to the embodiment, different processes can be used for the via conductor penetrating through the inside of the insulating layer and the columnar wiring penetrating through the inside of the magnetic layer, and the degree of freedom in manufacturing can be improved.

In the inductor array component, it is preferable that in a pair of one of the plurality of the first vertical wirings and one of the plurality of the second vertical wirings extending from a same position of the first inductor wiring or the second inductor wiring, one of the pair includes the via conductor and the columnar wiring and the other of the pair does not include the via conductor.

According to the embodiment, the other of the first vertical wiring and the second vertical wiring does not include the via conductor, and there is no insulating layer on the other side. Therefore, even with the same component outer shape, DC superposition characteristics of the inductor array component can be improved, and even with the same characteristics, the thickness of the inductor array component can be reduced.

In the inductor array component, it is preferable that a minimum distance of the metal magnetic powder toward the plurality of the first vertical wirings and the second vertical wirings is equal to or less than about 200 nm.

According to the embodiment, since the filling amount of the metal magnetic powder can be increased, the inductance can be increased.

In the inductor array component, it is preferable that a minimum distance of the metal magnetic powder toward the first inductor wiring and the second inductor wiring is equal to or less than about 200 nm.

According to the embodiment, since the filling amount of the metal magnetic powder can be increased, the inductance can be increased.

In the inductor array component, it is preferable that the magnetic layer include a main surface having irregularities and being parallel to the plane, and an arithmetic average roughness $R_a$ of the irregularities of the main surface of the magnetic layer be equal to or less than about 1/10 of a thickness of the magnetic layer.

According to the embodiment, since the irregularities of the main surface of the magnetic layer are small, stress is less likely to be applied to the surface irregularities of the inductor array component when the inductor array component is embedded, and it is possible to prevent the inductor array component from being damaged.

In the inductor array component, it is preferable that a coating film provided on a surface of the magnetic layer be further included.

According to the embodiment, when external terminals are provided on the surface of the magnetic layer, the coating film can enhance an insulation property between the external terminals. Further, the coating film can hide scratches on the surface of the magnetic layer.

In the inductor array component, it is preferable that an inductor wiring laminated in the normal direction of the first inductor wiring or the second inductor wiring be further included.

According to the embodiment, it is possible to reduce the mounting area by laminating the inductor wiring on the first inductor wiring or the second inductor wiring. Further, when the laminated inductor wiring are connected in series, it is possible to increase the inductance.

In the inductor array component, it is preferable that an interlayer via conductor connecting the inductor wiring and the first inductor wiring or the second inductor wiring in the normal direction be further included, and a center axis of the interlayer via conductor be shifted from a center axis of each of the first vertical wirings and the second vertical wirings when viewed from the normal direction.

According to the embodiment, it is possible to suppress recesses when the interlayer via conductor is formed, thereby providing an inductor array component having a stable quality.

In the inductor array component, it is preferable that an average grain diameter of the metal magnetic powder be equal to or more than about 1/30 and equal to or less than about 1/3 (i.e., from about 1/30 to about 1/3) of inscribed circles of inner magnetic paths of the first inductor wiring and the second inductor wiring when viewed from the normal direction.

According to the embodiment, magnetic permeability that can be obtained can be increased, and the metal magnetic powder can be stably filled into the inner magnetic path.

In the inductor array component, it is preferable that an average grain diameter of the metal magnetic powder be equal to or more than about 1/30 and equal to or less than about 1/3 (i.e., from about 1/30 to about 1/3) of a maximum distance between the first inductor wiring and the second inductor wiring.

According to the embodiment, the magnetic permeability that can be obtained can be increased, and the metal magnetic powder can be stably filled into between the first inductor wiring and the second inductor wiring.

In the inductor array component, it is preferable that an average grain diameter of the metal magnetic powder be equal to or more than about 1/10 and equal to or less than about 2/3 (i.e., from about 1/10 to about 2/3) of a thickness of the magnetic layer.

According to the above-described embodiment, the magnetic permeability that can be obtained can be increased, and effective magnetic permeability can be improved.

In the inductor array component, it is preferable that the magnetic layer further contain ferrite powder.

According to the embodiment, since the relative permeability of the ferrite powder is high, the effective magnetic permeability of the magnetic layer, which is the magnetic permeability per unit volume thereof, can be improved. Further, the insulating property of the magnetic layer can be improved.

In the inductor array component, it is preferable that the magnetic layer further contain non-magnetic powder made of an insulating material.

According to the embodiment, the magnetic layer contains the non-magnetic powder made of the insulating material such as a silica filler, and thus the insulating property of the magnetic layer can be improved.

According to another embodiment of the present disclosure, an inductor array component built-in substrate includes: the inductor array component; a substrate in which the inductor array component is embedded, and a substrate wiring including a pattern portion extending in a direction along a main surface of the substrate and a substrate via portion extending in a thickness direction of the substrate, and the substrate wiring is connected to the inductor array component in the substrate via portion.

According to the embodiment, the degree of freedom in circuit design can be improved.

In the inductor array component built-in substrate, it is preferable that the pattern portion of the substrate wiring be disposed in parallel with a plane on which the inductor wirings are disposed.

According to the embodiment, the inductor array component built-in substrate can be made thin.

Other features, elements, characteristics and advantages of the present disclosure will become more apparent from the following detailed description with reference to the attached drawings.

DETAILED DESCRIPTION

Hereinafter, an inductor array component according to an aspect of the present disclosure will be described in detail with reference to illustrated embodiments. Note that the drawings include some schematic ones and actual dimensions and ratios are not be reflected thereto in some cases.

First Embodiment

Configuration

Figure 1A:
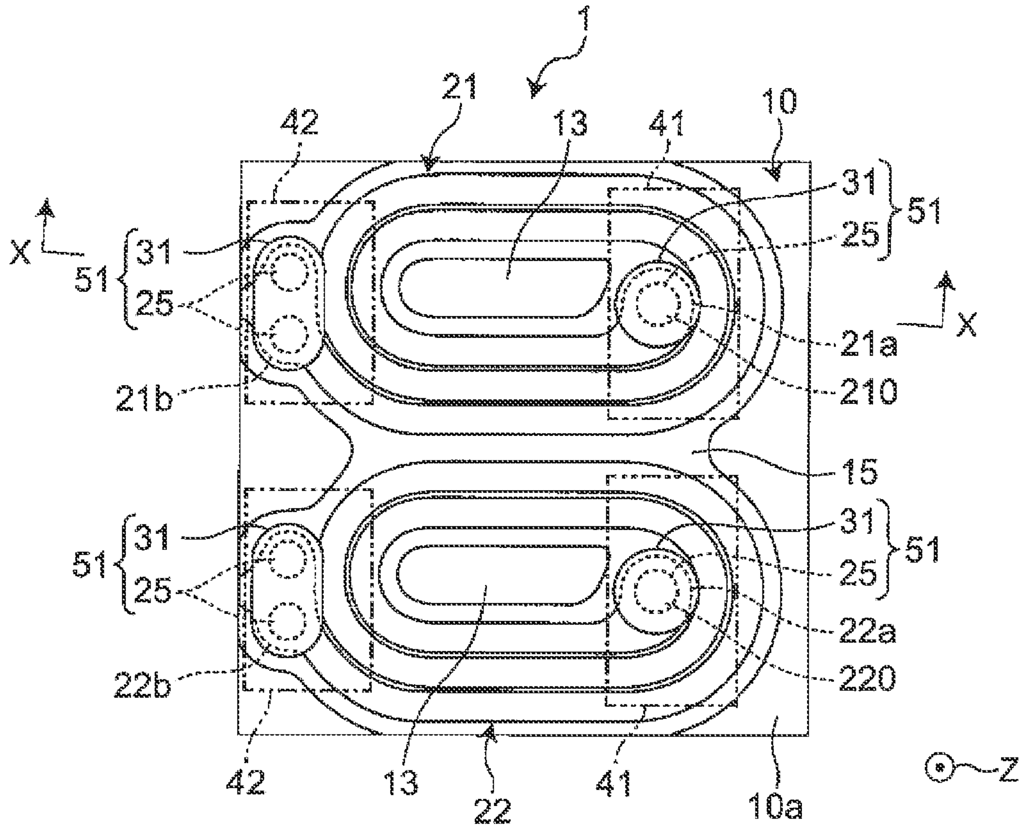
FIG. 1A is a perspective plan view illustrating an inductor array component according to a first embodiment.
Figure 1B:
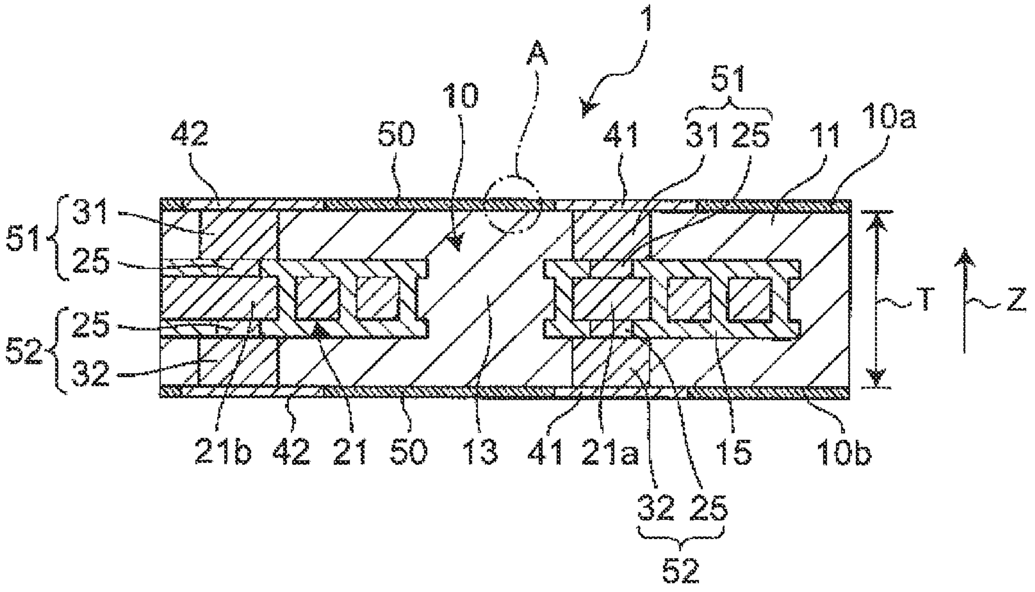
FIG. 1B is a cross-sectional view illustrating the inductor array component according to the first embodiment.
Figure 2:
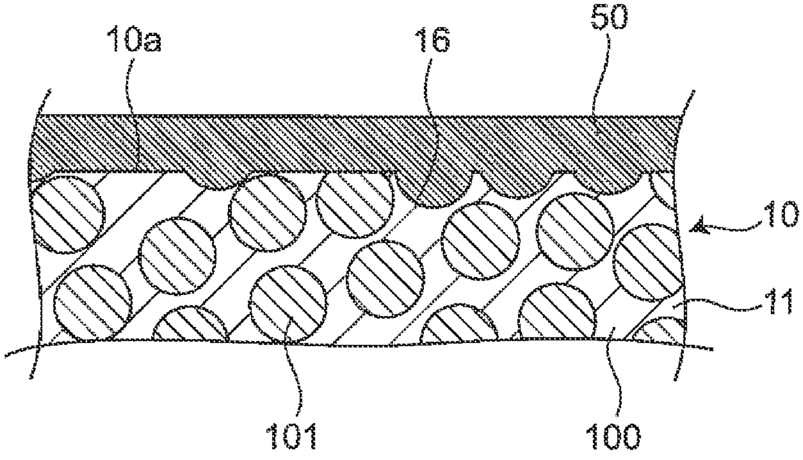
FIG. 2 is an enlarged view of a part A in FIG. 1B.

FIG. 1A is a perspective plan view illustrating an inductor array component according to a first embodiment. FIG. 1B is a cross-sectional view taken along line X-X in FIG. 1A. FIG. 2 is an enlarged view of a part A in FIG. 1B. An inductor array component 1 will be described with reference to FIGS. 1A, 1B, and 2.

The inductor array component 1 is mounted on, for example, an electronic device such as a personal computer, a DVD player, a digital camera, a TV, a mobile phone, and car electronics and has a substantially rectangular parallelepiped shape as a whole, for example. However, the shape of the inductor array component 1 is not particularly limited and may be a substantially cylindrical shape, a substantially polygonal columnar shape, a substantially truncated cone shape, or a substantially polygonal frustum shape.

The inductor array component 1 includes a main body 10, an insulating layer 15, inductor wirings 21 and 22, vertical wirings 51 and 52, external terminals 41 and 42, and coating films 50.

The first inductor wiring 21 is made of a conductive material and is wound in a substantially planar shape. That is, in the embodiment, the first inductor wiring 21 is a spiral wiring. The spiral wiring means a curve (two-dimensional curve) extending on a plane, and the number of turns drawn by the curve may be more than one or less than one. Further, the spiral wiring may have a plurality of curves wound in different directions or may have a straight line in a portion thereof.

A normal direction with respect to the plane on which the first inductor wiring 21 is wound is referred to as a Z direction (vertical direction) in the drawings. Hereinafter, a first direction which is a forward Z direction is defined as an upward direction and a second direction which is a reverse Z direction is defined as a downward direction. The same applies to the Z direction in the other embodiments and working examples. The first inductor wiring 21 is spirally wound in the clockwise direction from a first end 21*a*, which is an inner circumferential end, toward a second end 21*b*, which is an outer circumferential end, when viewed from the upper side. The first end 21*a* and the second end 21*b* may extend somewhat inward rather than at strict ends or may have protrusions that serve as current paths.

The second inductor wiring 22 has a configuration similar to that of the first inductor wiring 21 and is spirally wound in the clockwise direction from a first end 22*a*, which is an inner circumferential end, toward a second end 22*b*, which is an outer circumferential end. The first inductor wiring 21 and the second inductor wiring 22 are disposed in parallel on the same plane in the main body 10 and are adjacent to each other.

The first inductor wiring 21 and the second inductor wiring 22 are made of a conductive material and are made of, for example, a metal material having a low electrical resistance, such as Cu, Ag, Au, Fe, and an alloy containing any of these materials. The DC resistances of the first inductor wiring 21 and the second inductor wiring 22 can be reduced. As a working example of the first inductor wiring 21 and the second inductor wiring 22, the thickness thereof is about 45 μm, the wiring width thereof is about 50 μm, and the inter-wiring space (turn pitch) thereof is about 10 μm.

The main body 10 has a substantially flat plate shape. The main body 10 has a first main surface 10*a* located on the upper side and a second main surface 10*b* opposing the first main surface 10*a* and located on the lower side. The main body 10 includes a magnetic layer 11. A first main surface of the magnetic layer 11 corresponds to the first main surface 10*a* of the main body 10, and a second main surface of the magnetic layer 11 corresponds to the second main surface 10*b* of the main body 10.

The magnetic layer 11 sandwiches the inductor wirings 21 and 22 from both sides in the Z direction and is also disposed on the inner side portions and the outer side portions of the inductor wirings 21 and 22. As described above, the magnetic layer 11 constitutes closed magnetic paths for the inductor wirings 21 and 22. The magnetic layer 11 constitutes inner magnetic paths 13 on the inner side portions of the inductor wirings 21 and 22.

The magnetic layer 11 has resin 100 and metal magnetic powder 101 contained in the resin 100. The metal magnetic powder 101 can improve DC superposition characteristics, and the resin 100 electrically insulates grains of the metal magnetic powder 101 from one another, thereby reducing loss (iron loss) at a high frequency.

The resin 100 preferably contains at least one of epoxy-based resin and acrylic-based resin. Thereby, the insulating property of the magnetic layer 11 can be improved, and the mechanical strength of the magnetic layer 11 can be improved with a stress relaxation effect of the resin 100. The resin 100 contains, for example, at least one of epoxy-based resin, polyimide-based resin, phenol-based resin, and vinyl ether-based resin.

The metal magnetic powder 101 preferably contains Fe-based magnetic powder. This makes it possible to obtain excellent DC superposition characteristics. Examples of the Fe-based magnetic powder include FeSi-based alloys such as FeSiCr, FeCo-based alloys, Fe-based alloys such as NiFe, and amorphous alloys thereof. These Fe-based magnetic powders may be used alone or in combination.

The magnetic layer 11 preferably further contains ferrite powder. Since the relative permeability of the ferrite powder is high, the effective magnetic permeability of the magnetic layer 11, which is the magnetic permeability per unit volume thereof, can be improved, and the insulating property of the magnetic layer 11 can be enhanced. Examples of the ferrite powder include NiZn-based ferrite and MnZn-based ferrite. These ferrite powders may be used alone or in combination.

The magnetic layer 11 preferably contains non-magnetic powder made of an insulating material. The magnetic layer 11 contains the non-magnetic powder made of the insulating material such as a silica filler, and thus the insulating property of the magnetic layer can be improved. Note that the main body 10 may further include an insulator as well as the magnetic layer 11.

The insulating layer 15 is embedded in the main body 10 (the magnetic layer 11). The insulating layer 15 is in direct contact with the first inductor wiring 21 and the second inductor wiring 22 and covers the first inductor wiring 21 and the second inductor wiring 22. This makes it possible to improve the insulating properties of the first and second inductor wirings 21 and 22. The insulating layer 15 may cover a part of the first inductor wiring 21 and the second inductor wiring 22, may be in direct contact with the first inductor wiring 21 or the second inductor wiring 22, or may be disposed at a distance from the first inductor wiring 21 and the second inductor wiring 22. More specifically, the insulating layer 15 may cover only the bottom surface(s) of the first inductor wiring 21 and/or the second inductor wiring 22 or may cover only the top surface(s) and the side surfaces thereof. In addition, in this case, the insulating layer 15 may cover the entire surfaces of the bottom surfaces, the top surfaces, and the side surfaces, may cover only a portion of the surfaces, or may cover a plurality of portions thereof.

The insulating layer 15 is a non-magnetic member that does not contain a magnetic material and contains an insulating material. The insulating material is, for example, insulating organic resin, and more specifically, contains at least one of epoxy-based resin, phenol-based resin, polyimide-based resin, acrylic-based resin, and vinyl ether-based resin. When the insulating layer 15 contains any of these insulating organic resins, the first inductor wiring 21 and the second inductor wiring 22 and the resin 100 contained in the magnetic layer 11 are brought into close contact with each other with the above-described resin of the insulating layer 15 interposed therebetween. As a result, close contact force between the first inductor wiring 21 and the second inductor wiring 22 and the magnetic layer 11 can be improved. Further, the insulating organic resin of the insulating layer 15 makes the insulating layer 15 softer than an inorganic material. Therefore, the inductor array component 1 can have flexibility, and mechanical strength and resistance to the thermal shock can be improved. The insulating layer 15 may contain a non-magnetic filler such as silica, and in this case, it is possible to improve the strength, the workability, and the electrical characteristics of the insulating layer 15.

The plurality of first vertical wirings 51 extends from the sides of the first end 21*a* and the second end 21*b* of the first inductor wiring 21 and the sides of the first end 22*a* and the second end 22*b* of the second inductor wiring 22, respectively, in the first direction (the forward Z direction) so as to penetrate through the inside of the main body 10 and is exposed on the side of the first main surface 10*a* of the main body 10. Specifically, the plurality of first vertical wirings 51 includes via conductors 25 that extend from the first end 21*a* and the second end 21*b* of the first inductor wiring 21 and the first end 22*a* and the second end 22*b* of the second inductor wiring 22, respectively, in the first direction and penetrate through the inside of the insulating layer 15, and first columnar wirings 31 that extend from the via conductors 25 in the first direction and penetrate through the inside of the magnetic layer 11.

The plurality of second vertical wirings 52 extends from the sides of the first end 21*a* and the second end 21*b* of the first inductor wiring 21 and the sides of the first end 22*a* and the second end 22*b* of the second inductor wiring 22, respectively, in the second direction (the reserve Z direction) so as to penetrate through the inside of the main body 10 and is exposed on the side of the second main surface 10*b* of the main body 10. Specifically, the plurality of second vertical wirings 52 includes the via conductors 25 that extend from the first end 21*a* and the second end 21*b* of the first inductor wiring 21 and the first end 22*a* and the second end 22*b* of the second inductor wiring 22, respectively, in the second direction and penetrate through the inside of the insulating layer 15, and second columnar wirings 32 that extend from the via conductors 25 in the second direction and penetrate through the inside of the magnetic layer 11.

The external terminals 41 and 42 are electrically connected to the first and second inductor wirings 21 and 22 and are exposed from the first and second main surfaces 10*a* and 10*b* of the main body 10. The external terminals 41 and 42 cover parts of the first and second main surfaces 10*a* and 10*b* of the main body 10 and are electrically connected to the first and second inductor wirings 21 and 22 with the vertical wirings 51 and 52 interposed therebetween. The external terminals 41 and 42 are made of a conductive material. The conductive material is, for example, at least one of Cu, Ni, and Au, or an alloy thereof. Further, each of the external terminals 41 and 42 may be a multi-layer metal film in which a plurality of metal films is laminated on each other.

The plurality of first external terminals 41 is provided on each of the first main surface 10*a* and the second main surface 10*b* of the main body 10. On the first main surface 10*a*, the plurality of first external terminals 41 is connected to the first vertical wiring 51 connected to the first end 21*a* of the first inductor wiring 21 and the first vertical wiring 51 connected to the first end 22*a* of the second inductor wiring 22, respectively. The first external terminals 41 cover the end surfaces of the first vertical wirings 51 (first columnar wirings 31) exposed from the first main surface 10*a* of the main body 10. On the second main surface 10*b*, the plurality of first external terminals 41 is connected to the second vertical wiring 52 connected to the first end 21*a* of the first inductor wiring 21 and the second vertical wiring 52 connected to the first end 22*a* of the second inductor wiring 22, respectively.

The plurality of second external terminals 42 is provided on each of the first main surface 10*a* and the second main surface 10*b* of the main body 10. On the first main surface 10*a*, the plurality of second external terminals 42 is connected to the first vertical wiring 51 connected to the second end 21*b* of the first inductor wiring 21 and the first vertical wiring 51 connected to the second end 22*b* of the inductor wiring 22, respectively. The second external terminals 42 cover the end surfaces of the first vertical wirings 51 (first columnar wirings 31) exposed from the first main surface 10*a* of the main body 10. On the second main surface 10*b*, the plurality of second external terminals 42 is connected to the second vertical wiring 52 connected to the second end 21*b* of the first inductor wiring 21 and the second vertical wiring 52 connected to the second end 22*b* of the second inductor wiring 22, respectively.

The coating films 50 are provided on the surfaces of the magnetic layer 11. The coating films 50 cover parts of the first and second main surfaces 10*a* and 10*b* of the main body 10 and expose the end surfaces of the external terminals 41 and 42. Accordingly, the coating films 50 can enhance insulating properties between the external terminals 41 and 42 (specifically, between the first external terminal 41 and the second external terminal 42, between the adjacent first external terminals 41 and 41, and between the adjacent second external terminals 42 and 42). In addition, the coating films 50 can hide scratches on the first and second main surfaces 10*a* and 10*b* of the main body 10. The coating films 50 do not contain a magnetic material, that is, are non-magnetic members. The coating films 50 are made of, for example, the insulating material exemplified as the material of the insulating layer 15.

With the above-described inductor array component 1, the first and second vertical wirings 51 and 52 are extended to the first and second inductor wirings 21 and 22 in the first direction and the second direction, so that the degree of freedom in connection with wirings of a mounting substrate is improved. The inductor array component 1 can be connected to an input terminal only from the upper side and can be connected to an output terminal only from the lower side, for example. Further, the first and second vertical wirings 51 and 52 are extended to the first and second inductor wirings 21 and 22 in the first direction and the second direction, so that upper and lower stresses to the first and second inductor wirings 21 and 22 of the inductor array component 1 can be approximated. Therefore, warpage of the inductor array component 1 can be suppressed. The first and second vertical wirings 51 and 52 are extended from all the first ends 21*a* and 22*a* and the second ends 21*b* and 22*b* of the first and second inductor wirings 21 and 22 in the vertical direction of the inductor array component 1. It is therefore possible to use the inductor array component 1 without distinguishing the front and back sides thereof and to eliminate processes of checking and aligning the front and back sides when the inductor array component is manufactured and mounted.

It is preferable that a pair of one of the first vertical wirings 51 and one of the second vertical wirings 52 extending from a same position of the first inductor wiring 21 or the second inductor wiring 22 has a common axis extending in center axes of the pair, that is, the center axes of the second vertical wirings 52 extending in the second direction from the same positions as the plurality of first vertical wirings 51 be on the same axes as the center axes of the first vertical wirings 51. Specifically, the center axes of the first columnar wirings 31 of the first vertical wirings 51 and the center axes of the second columnar wirings 32 of the second vertical wirings 52 are on the same axes, and the center axes of the via conductors 25 of the first vertical wirings 51 and the center axes of the via conductors 25 of the second vertical wirings 52 are on the same axes. Note that in the same first vertical wirings 51, the center axes of the first columnar wirings 31 and the center axes of the via conductors 25 are preferably on the same axes but may be eccentric from each other. The same applies to the second vertical wirings 52.

With this configuration, since the center axes of the first vertical wirings 51 and the second vertical wirings 52 as pairs are on the same axes, physical and electrical differences between the front and back sides of the inductor array component 1 can be reduced. On the other hand, when the center axes deviate from each other, differences are generated between the front and back sides of the inductor array component. When the differences exist, it is necessary to check the front and back sides of the inductor array component in mounting, in particular, in the case where the inductor array component is desired to be used with high accuracy. When paths of currents flowing to the inductor wirings are different between the front and back sides due to deviation in the connection positions of the vertical wirings, the effective Rdc and the inductance are also slightly different between the front and back sides.

It is preferable that the plurality of first and second vertical wirings 51 and 52 include the via conductors 25 and the columnar wirings 31 and 32. With this configuration, different processes can be used for the via conductors 25 penetrating through the inside of the insulating layer 15 and the columnar wirings 31 and 32 penetrating through the inside of the magnetic layer 11, and the degree of freedom in manufacturing can be improved.

In the inductor array component 1, all of the plurality of first vertical wirings and the plurality of second vertical wirings include the via conductors and the columnar wirings. However, the disclosure is not limited thereto and at least one of the plurality of first vertical wirings and the plurality of second vertical wirings may include the via conductor and the columnar wiring. Specifically, in the pair of the first vertical wiring and the second vertical wiring extending in the normal direction extending from the same position of the first inductor wiring or the second inductor wiring, one of them includes the via conductor and the columnar wiring and the other thereof does not include the via conductor.

Figure 3:
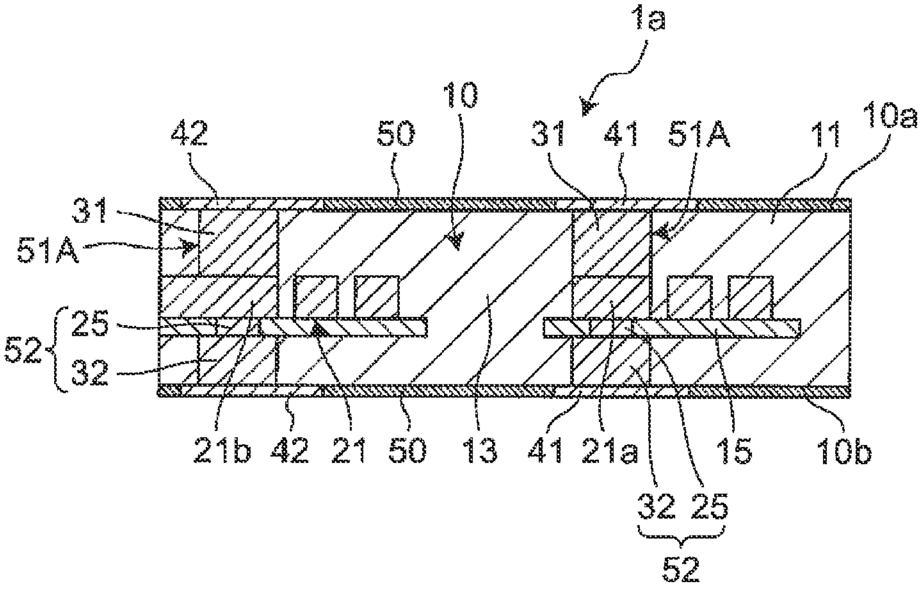
FIG. 3 is a cross-sectional view illustrating another inductor array component.

For example, as illustrated in FIG. 3, in another inductor array component 1*a*, the insulating layer 15 covers only the bottom surfaces of the first inductor wiring 21 and the second inductor wiring 22 and the top surfaces and the side surfaces of the first inductor wiring 21 and the second inductor wiring 22 are in contact with the magnetic layer 11. In this case, the second vertical wirings 52 include the via conductors 25 and the columnar wirings 32 while first vertical wirings 51A do not include the via conductor 25 and include the columnar wirings 31.

With this configuration, the others of the first vertical wirings and the second vertical wirings do not include the via conductor, and there is no insulating layer on the other side. Therefore, even with the same component outer shape, the DC superposition characteristics of the inductor array component can be improved, and even with the same characteristics, the thickness of the inductor array component can be reduced.

It is preferable that a minimum distance of the metal magnetic powder 101 toward the first vertical wirings 51 and the second vertical wirings 52 be equal to or less than about 200 nm. With this configuration, since the filling amount of the metal magnetic powder 101 in the magnetic layer 11 can be increased, the inductance of the inductor array component 1 can be increased. For measurement of the minimum distance, a scanning electron microscope (SEM) image of a cross section passing through the center axis of each first vertical wiring 51 is used. That is, the distances between the first vertical wirings 51 and grains of the metal magnetic powder 101 in the vicinity thereof are measured using the SEM images, and the minimum distance among the obtained distances is defined as the minimum distance. The same applies to the second vertical wirings 52. Note that the magnification of the SEM images for measuring the distances is set to 10000 times or the magnification is set such that about 30 grains of the metal magnetic powder 101 are contained.

It is preferable that a minimum distance of the metal magnetic powder 101 toward the first inductor wiring 21 and the second inductor wiring 22 be equal to or less than about 200 nm. With this configuration, since the filling amount of the metal magnetic powder 101 in the magnetic layer 11 can be increased, the inductance of the inductor array component 1 can be increased. For measurement of the minimum distance, an SEM image of a cross section passing through the center axis of the first inductor wiring 21 is used. That is, the distances between the first inductor wiring 21 and grains of the metal magnetic powder 101 in the vicinity thereof are measured using the SEM images, and the minimum distance among the obtained distances is defined as the minimum distance. The same applies to the second inductor wiring 22.

It is preferable that the main surfaces (the first and second main surfaces 10*a* and 10*b* of the main body 10) of the magnetic layer 11 have irregularities. The main surfaces of the magnetic layer 11 are parallel to a plane on which the first inductor wiring 21 and the second inductor wiring 22 are disposed. The irregularities are formed by removing some of the grains of the metal magnetic powder 101 from the first and second main surfaces 10*a* and 10*b*. The irregularities are mainly constituted by flatness of the resin 100 and recesses 16 formed by the removal of the grains of the metal magnetic powder 101. In the main surfaces 10*a* and 10*b* of the main body 10 in the embodiment, the recesses 16 formed by the removal of the grains of the metal magnetic powder 101 are dominant in the arithmetic average roughness $R_a$ described later. Since the layers (for example, the coating films 50 and the first and second external terminals 41 and 42) that are in contact with the main surfaces 10*a* and 10*b* enter the recesses 16, close contact between the main surfaces 10*a* and 10*b* of the main body 10 and the layers in contact with the main surfaces 10*a* and 10*b* is improved by an anchor effect.

It is preferable that the arithmetic average roughness $R_a$ of the irregularities in the main surfaces of the magnetic layer 11 be equal to or less than about 1/10 of the thickness T of the magnetic layer 11. When the arithmetic average roughness $R_a$ is equal to or less than about 1/10 of the thickness T of the magnetic layer 11 as described above, the irregularities of the main surfaces of the magnetic layer 11 are small. Therefore, stress is less likely to be applied to the surface irregularities of the inductor array component 1 when the inductor array component 1 is embedded, and it is possible to prevent the inductor array component 1 from being damaged.

The arithmetic average roughness $R_a$ is an arithmetic average roughness of a portion excluding portions overlapping the first and second external terminals 41 and 42 on a straight line on the first main surface 10*a* of the main body 10, which passes through the first and second external terminals 41 and 42. In the embodiment, the straight line is a straight line on the first main surface 10*a*, which is drawn to pass through the first and second external terminals 41 and 42, and is, for example, a straight line on the first main surface 10*a* at a position indicated by X-X cross-sectional line in FIG. 1A. The arithmetic average roughness $R_a$ can be measured by using a shape analysis laser microscope ("Shape Measurement Laser Microscope VK-X100" manufactured by KEYENCE CORPORATION). More specifically, the coating film 50 of the inductor array component 1 is peeled off to expose the first main surface 10*a* of the main body 10. In the exposed first main surface 10*a*, the arithmetic average roughness $R_a$ of the portion including the straight line on the first main surface 10*a*, which passes through the external terminals 41 and 42, is measured at a measurement magnification of 50 times. Note that the same applies to the second main surface 10*b*.

The thickness T of the magnetic layer 11 is the thickness of the magnetic layer 11 in the Z direction. The thickness T is measured by using a scanning electron microscope. Specifically, the inductor array component 1 is cut in the Z direction by the straight line on the first main surface 10*a*, which is drawn to pass through the first and second external terminals 41 and 42, and an SEM image is obtained from a cross section of a measurement sample by using the scanning electron microscope. The thickness T is measured using the SEM image.

It is sufficient that at least one of the first and second main surfaces 10*a* and 10*b* satisfies $R_a$ of equal to or less than about T/10. In addition, when a plurality of magnetic layers 11 is provided, the thickness T of the magnetic layer refers to the sum of the thicknesses of the plurality of magnetic layers. When a non-magnetic layer is present between the plurality of magnetic layers 11, the thickness of the non-magnetic layer is not included in the thickness T.

It is preferable that the average grain diameter of the metal magnetic powder 101 be equal to or more than about 1/30 and equal to or less than about 1/3 (i.e., from about 1/30 to about 1/3) of inscribed circles of inner magnetic paths of the first and second inductor wirings 21 and 22 when viewed from the normal direction (Z direction). According to this, since the average grain diameter of the metal magnetic powder 101 is equal to or more than about 1/30, the average grain diameter of the metal magnetic powder 101 does not become smaller than necessary. Therefore, the magnetic permeability of the inductor array component 1, which can be obtained, can be increased. Further, since the average grain diameter is equal to or less than about 1/3, the metal magnetic powder 101 can be stably filled into the inner magnetic path. The inscribed circle of the inner magnetic path refers to a circle having the largest diameter among circles that are in contact with the inner circumferential end of the first or second inductor wiring 21 or 22 when the first and second inductor wirings 21 and 22 are viewed in the Z direction. For example, the average grain diameter of the metal magnetic powder 101 is about 45 μm, and the inscribed circle of the inner magnetic path is about 900 μm. Although the first and second inductor wirings 21 and 22 are covered with the insulating layer 15, the thickness of the insulating layer 15 may not be considered because the thickness of the insulating layer 15 is small. Specifically, it can be said that the thickness of the insulating layer 15 is sufficiently thin when it is equal to or less than about 1/10 of the maximum diameter of the inscribed circles of the inner magnetic paths of the first or second inductor wirings 21 and 22.

The average grain diameter of the metal magnetic powder 101 is, for example, equal to or more than about 0.1 μm and equal to or less than about 50 μm (i.e., from about 0.1 μm to about 50 μm), preferably equal to or more than about 1 μm and equal to or less than about 30 μm (i.e., from about 1 μm to about 30 μm), and more preferably equal to or more than about 2 μm and equal to or less than about 5 μm (i.e., from about 2 μm to about 5 μm). The average grain diameter of the metal magnetic powder 101 can be calculated as a grain diameter (volume median diameter $D_{50}$) corresponding to an integrated value 50% in grain size distribution obtained by a laser diffraction/scattering method in a raw material state in which the metal magnetic powder 101 is contained in the resin 100. In a state of the finished product of the inductor array component 1, the average grain diameter of the metal magnetic powder 101 is measured using an SEM image of a cross section passing through a straight line on the first and second main surfaces 10*a* and 10*b* of the main body 10. Specifically, in an SEM image at a magnification at which equal to or more than 15 grains of the metal magnetic powder 101 can be checked, the areas of the respective grains of the metal magnetic powder 101 are measured to calculate equivalent circle diameters. Then, an arithmetic average value of the equivalent circle diameters is defined as the average grain diameter of the metal magnetic powder 101. It is preferable that the average grain diameter of the metal magnetic powder 101 be equal to or more than about 1/10 and equal to or less than about 2/3 (i.e., from about 1/10 to about 2/3) of the thickness T of the magnetic layer 11. According to this, since the average grain diameter of the metal magnetic powder 101 is equal to or more than about 1/10, the average grain diameter of the metal magnetic powder 101 does not become smaller than necessary for the magnetic layer 11. Therefore, the magnetic permeability of the inductor array component 1, which can be obtained, can be increased. Further, since the average grain diameter of the metal magnetic powder 101 is equal to or less than about 2/3, the removal of the metal magnetic powder 101 in grinding of the magnetic layer 11 can be reduced, and the effective magnetic permeability can be improved.

Manufacturing Method

Next, a method of manufacturing the inductor array component 1 will be described.

Figure 4A:
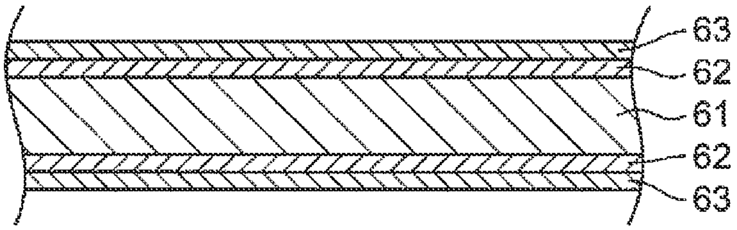
FIG. 4A is an explanatory view for explaining a manufacturing method of the inductor array component according to the first embodiment.

As illustrated in FIG. 4A, a dummy core substrate 61 is prepared. Both surfaces of the dummy core substrate 61 have substrate copper foils. In the embodiment, the dummy core substrate 61 is a glass epoxy substrate. The thickness of the dummy core substrate 61 does not affect the thickness of the inductor array component. Therefore, it is sufficient to appropriately use a substrate the thickness and a material of which are easily handled for warpage in processing, or the like.

Next, copper foils 62 are made to adhere to the surfaces of the substrate copper foils. The copper foils 62 are made to adhere to smooth surfaces of the substrate copper foils. Therefore, it is possible to weaken adhesion between the copper foils 62 and the substrate copper foils, thereby easily peeling off the dummy core substrate 61 from the copper foils 62 in a subsequent process. Preferably, an adhesive for adhesion between the dummy core substrate 61 and dummy metal layers (copper foils 62) is a low tack adhesive. In order to weaken the adhesion between the dummy core substrate 61 and the copper foils 62, it is desirable that adhesion surfaces of the dummy core substrate 61 and the copper foils 62 be glossy surfaces.

Then, insulating layers 63 are laminated on the copper foils 62. In this case, the insulating layers 63 are thermally pressure-bonded and thermally cured by a vacuum laminator, a press machine, or the like.

Figure 4B:
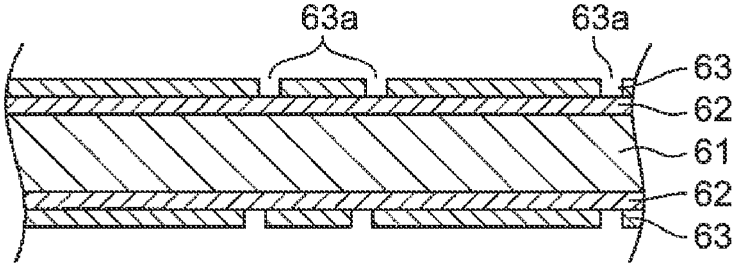
FIG. 4B is an explanatory view for explaining the manufacturing method of the inductor array component according to the first embodiment.
Figure 4C:
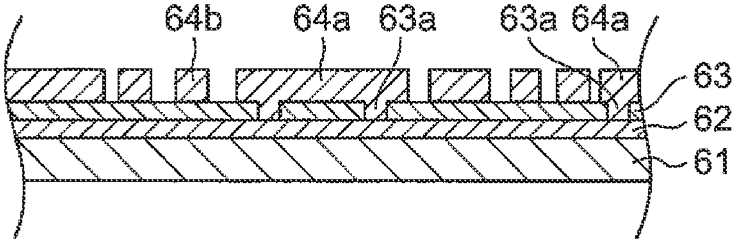
FIG. 4C is an explanatory view for explaining the manufacturing method of the inductor array component according to the first embodiment.

As illustrated in FIG. 4B, cavities 63*a* are formed in the insulating layers 63 by laser processing or the like. As illustrated in FIG. 4C, dummy coppers 64*a* and inductor wirings 64*b* are formed on the insulating layer 63. Specifically, a power supply film (not illustrated) for SAP is formed on the insulating layer 63 by electroless plating, sputtering, vapor deposition, or the like. After the power supply film is formed, photosensitive resist is applied or attached onto the power supply film, and cavities are formed, by photolithography, in the photosensitive resist at places where wiring patterns are to be formed. Then, metal wirings corresponding to the dummy coppers 64*a* and the inductor wirings 64*b* are formed in the cavities of the photosensitive resist layer. After the metal wirings are formed, the photosensitive resist is peeled and removed by a chemical solution, and the power supply film is removed by etching. Subsequently, additional copper electroplating is performed by using the metal wirings as power supply portions to obtain wirings in a narrow space. Further, the cavities 63*a* formed in FIG. 4B are filled with copper by the SAP.

Figure 4D:
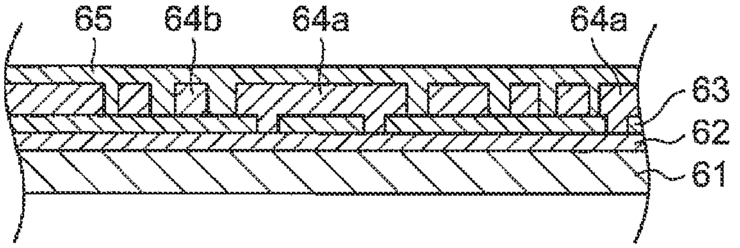
FIG. 4D is an explanatory view for explaining the manufacturing method of the inductor array component according to the first embodiment.

As illustrated in FIG. 4D, the dummy coppers 64*a* and the inductor wirings 64*b* are covered with an insulating layer 65.

The insulating layer 65 is thermally pressure-bonded and thermally cured by the vacuum laminator, the press machine, or the like.

Figure 4E:
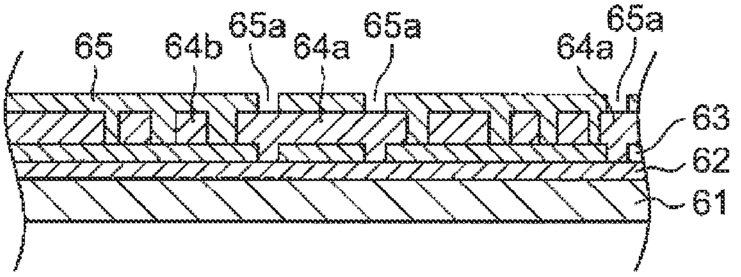
FIG. 4E is an explanatory view for explaining the manufacturing method of the inductor array component according to the first embodiment.

Next, as illustrated in FIG. 4E, cavities 65*a* are formed in the insulating layer 65 by laser processing or the like.

Figure 4F:
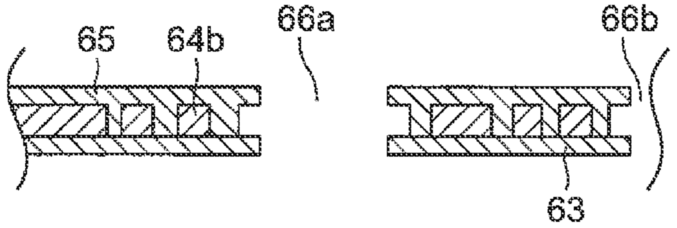
FIG. 4F is an explanatory view for explaining the manufacturing method of the inductor array component according to the first embodiment.

Then, the dummy core substrate 61 is peeled off from the copper foil 62. Then, the copper foil 62 is removed by etching or the like, and the dummy coppers 64*a* are removed by etching or the like. With the removal, as illustrated in FIG. 4F, a hole portion 66*a* corresponding to the inner magnetic path and a hole portion 66*b* corresponding to an outer magnetic path are formed.

Figure 4G:
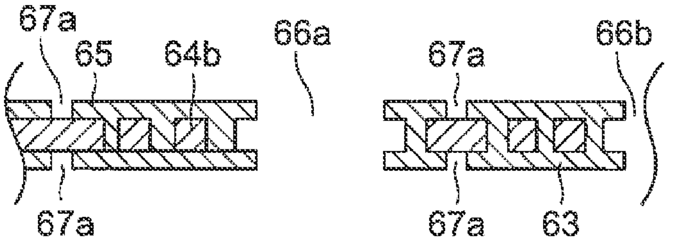
FIG. 4G is an explanatory view for explaining the manufacturing method of the inductor array component according to the first embodiment.
Figure 4H:
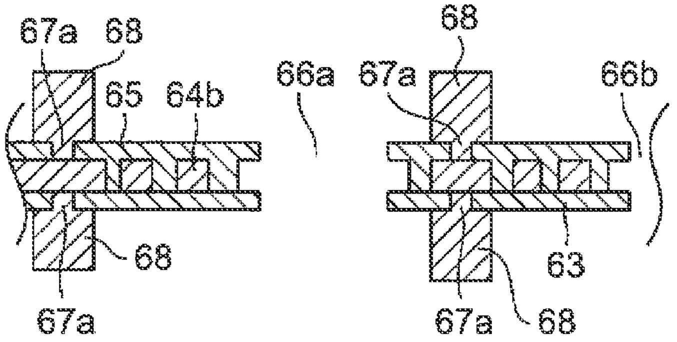
FIG. 4H is an explanatory view for explaining the manufacturing method of the inductor array component according to the first embodiment.

Thereafter, as illustrated in FIG. 4G, insulating layer cavities 67*a* are formed by laser processing or the like. Then, as illustrated in FIG. 4H, the insulating layer cavities 67*a* are filled with copper by the SAP, and columnar wirings 68 are formed on the insulating layer 63.

Figure 4I:
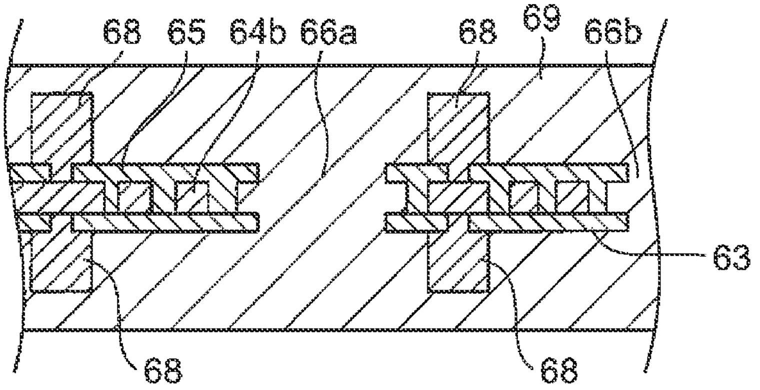
FIG. 4I is an explanatory view for explaining the manufacturing method of the inductor array component according to the first embodiment.

Subsequently, as illustrated in FIG. 4I, an inductor substrate is formed by covering the inductor wirings, the insulating layer, and the columnar wirings by a magnetic material (magnetic layer) 69. The magnetic material 69 is thermally pressure-bonded and thermally cured by the vacuum laminator, the press machine, or the like. In this case, the magnetic material 69 is also filled into the hole portions 66*a* and 66*b*.

Figure 4J:
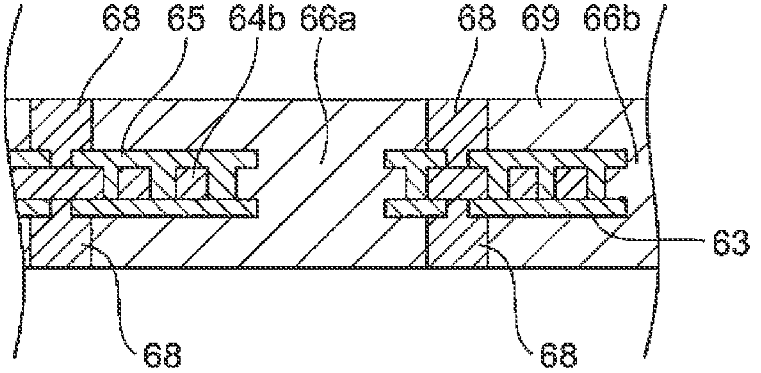
FIG. 4J is an explanatory view for explaining the manufacturing method of the inductor array component according to the first embodiment.

As illustrated in FIG. 4J, the magnetic material 69 on the upper and lower sides of the inductor substrate is thinned by a grinding method. In this case, by exposing a part of the columnar wirings 68, exposed portions of the columnar wirings 68 are formed on the same plane as the magnetic material 69. By grinding the magnetic material 69 to a thickness with which a sufficient inductance value is obtained, the inductor array component can be reduced in thickness.

Figure 4K:
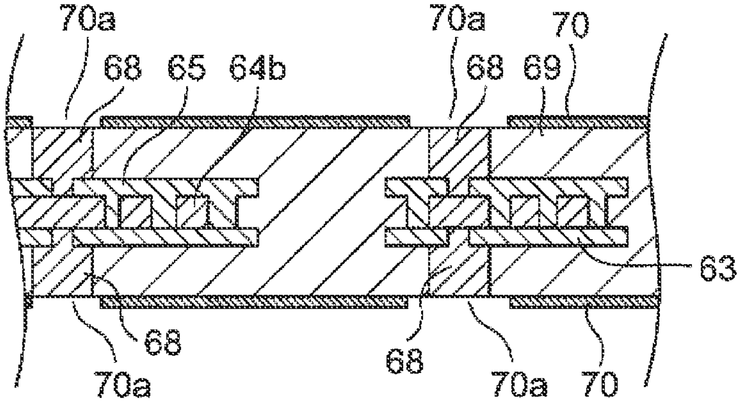
FIG. 4K is an explanatory view for explaining the manufacturing method of the inductor array component according to the first embodiment.

Then, as illustrated in FIG. 4K, insulating resins (coating films) 70 are formed on the surfaces of the magnetic material by a printing method. Cavities 70*a* in the insulating resins 70 serve as formation portions of external terminals. Although in the working example, the printing method is used, the cavities 70*a* may be formed by the photolithography method.

Figure 4L:
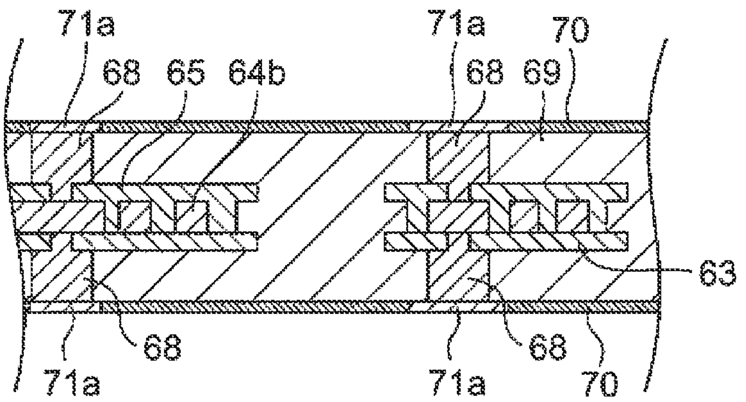
FIG. 4L is an explanatory view for explaining the manufacturing method of the inductor array component according to the first embodiment.
Figure 4M:
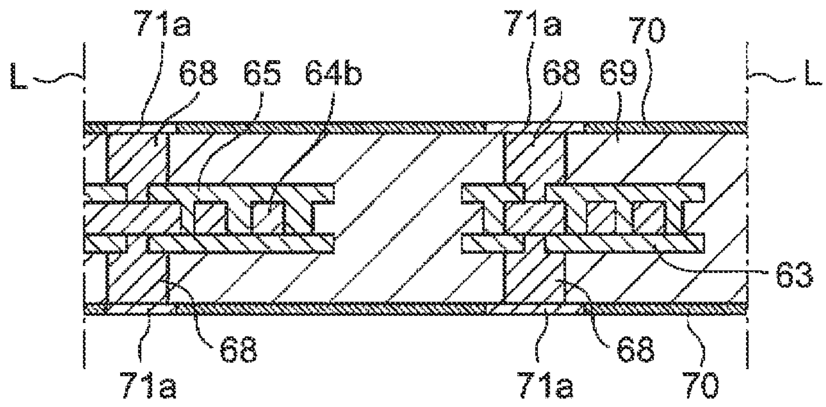
FIG. 4M is an explanatory view for explaining the manufacturing method of the inductor array component according to the first embodiment.

Thereafter, as illustrated in FIG. 4L, external terminals 71*a* are formed by electroless copper plating or plating film formation with Ni, Au, or the like. As illustrated in FIG. 4M, the substrate is divided by cutting along broken lines L with a dicing machine, thereby obtaining the inductor array component in FIG. 1B. Although description is omitted from FIG. 4C and subsequent drawings, the inductor substrates may be formed on both surfaces of the dummy core substrate 61. With this, high productivity can be obtained.

Second Embodiment

Figure 5:
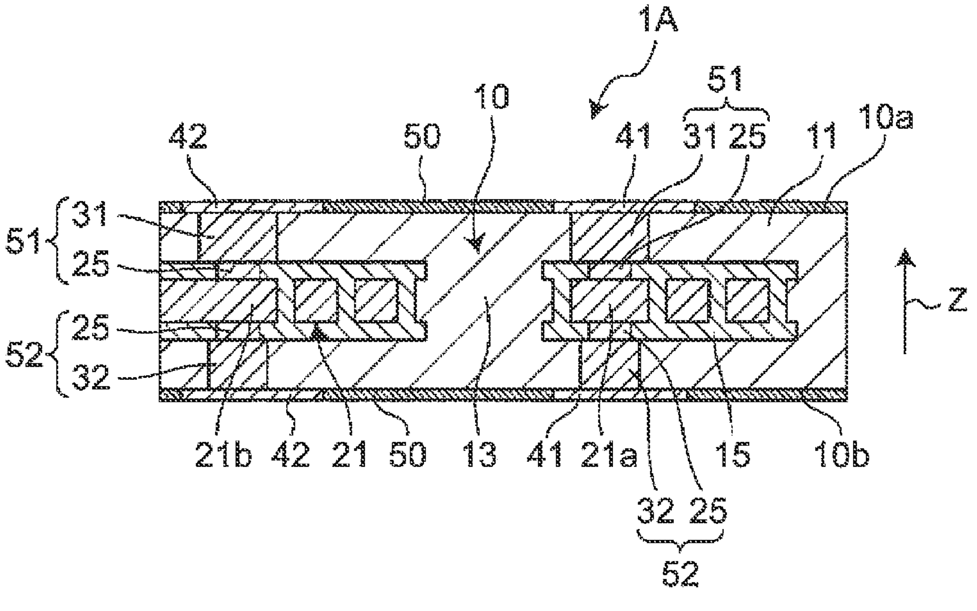
FIG. 5 is a cross-sectional view illustrating an inductor array component according to a second embodiment.

FIG. 5 is a cross-sectional view illustrating an inductor array component according to a second embodiment. The second embodiment is different from the first embodiment in the cross-sectional areas of the first vertical wirings and the second vertical wirings. This different configuration will be described below. In the second embodiment, the same reference numerals as those in the first embodiment denote the same configurations as those in the first embodiment, and description thereof will therefore be omitted.

As illustrated in FIG. 5, in an inductor array component 1A in the second embodiment, a pair of one of the plurality of the first vertical wirings 51 and one of the plurality of the second vertical wirings 52 extending from a same position of the first inductor wiring 21 or the second inductor 22 wiring has cross-sectional areas different from each other, that is, the cross-sectional areas of the first vertical wirings 51 and the second vertical wirings 52 are different from each other in the first vertical wirings 51 and the second vertical wirings 52 that are connected at the same positions. More specifically, for example, the cross-sectional areas of the second columnar wirings 32 are smaller than those of the first columnar wirings 31. The cross-sectional areas of the first and second vertical wirings 51 and 52 are the areas of the vertical wirings 51 and 52 in cross sections orthogonal to the direction (Z direction) in which the vertical wirings 51 and 52 extend.

When the cross-sectional areas of the first vertical wirings 51 and the second vertical wirings 52 are different from each other, it is possible to select the first and second vertical wirings 51 and 52 to be connected in accordance with the densities of currents flowing through the inductor wirings 21 and 22. Therefore, it is not necessary for the vertical wirings 51 and 52 to have a uniform cross-sectional area. By making the cross-sectional areas of the second vertical wirings 52 smaller than the cross-sectional areas of the first vertical wirings 51 to increase the volume of the magnetic layer 11 around the second vertical wirings 52, the inductance of the inductor array component 1 can be improved with the same outer shape.

The cross-sectional areas of the first vertical wirings 51 may be smaller than the cross-sectional areas of the second vertical wirings 52. In this case, by increasing the volume of the magnetic layer 11 around the first vertical wirings 51, the inductance can be improved with the same outer shape as the inductor array component 1. In addition, the cross-sectional areas of the first vertical wiring 51 and the second vertical wiring 52 may be different from each other in at least one of the pairs of the first vertical wirings 51 and the second vertical wirings 52 connected at the same positions.

Third Embodiment

Figure 6A:
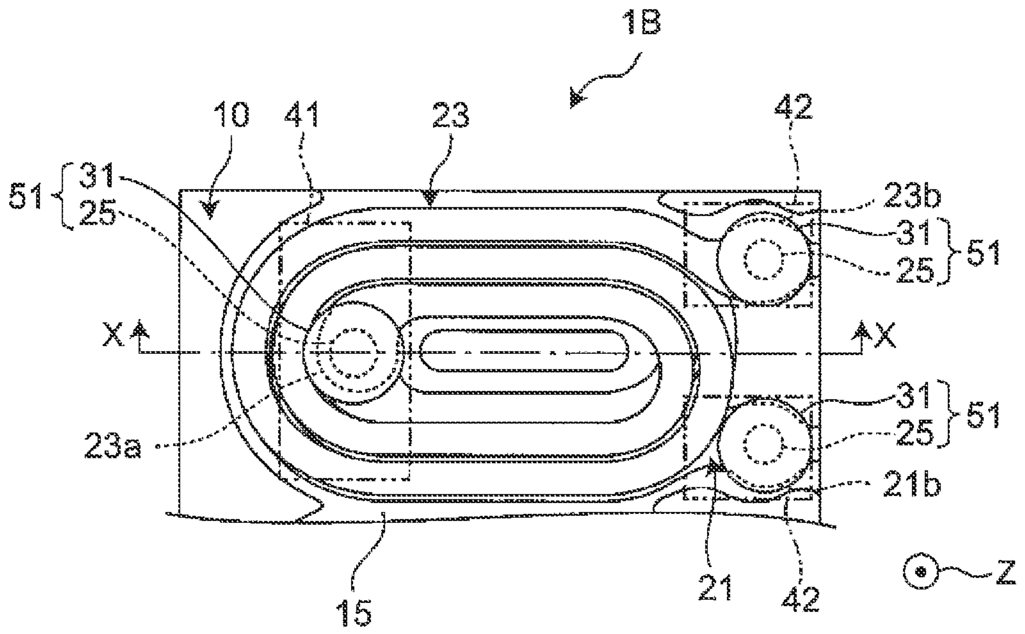
FIG. 6A is a perspective plan view illustrating an inductor array component according to a third embodiment.
Figure 6B:
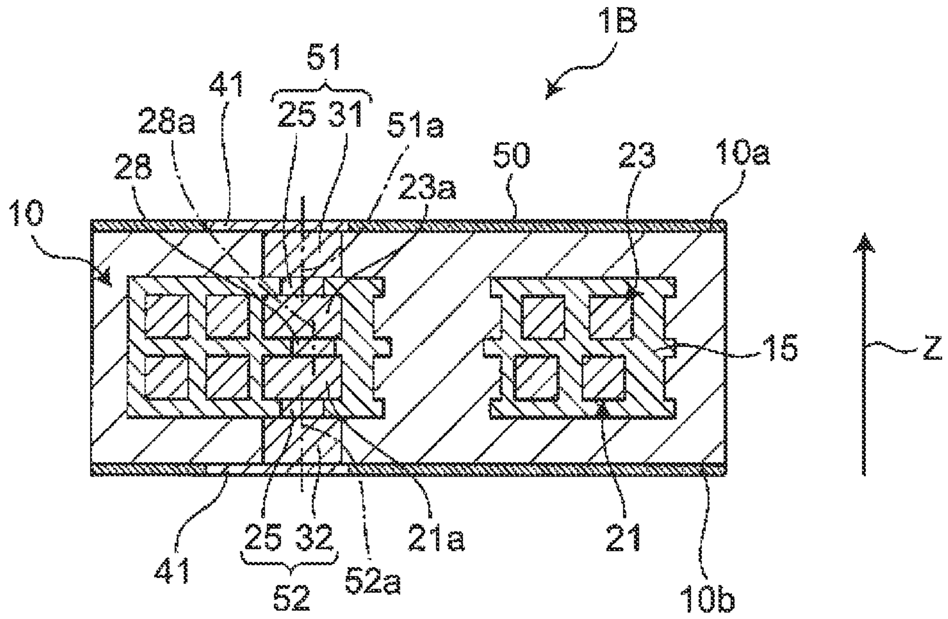
FIG. 6B is a cross-sectional view illustrating the inductor array component according to the third embodiment.

FIG. 6A is a perspective plan view illustrating an inductor array component according to a third embodiment. FIG. 6B is a cross-sectional view (cross-sectional view taken along line X-X in FIG. 6A) illustrating the inductor array component according to the third embodiment. The third embodiment is different from the first embodiment in the configuration of the inductor wirings (more specifically, the shape and the number of inductor wirings) and in that an interlayer via conductor is further included. This different configuration will be described below. In the third embodiment, the same reference numerals as those in the first embodiment denote the same configurations as those in the first embodiment, and description thereof will therefore be omitted.

As illustrated in FIGS. 6A and 6B, in an inductor array component 1B of the third embodiment, a plurality of inductor wirings is laminated in the normal direction (Z direction) of the first inductor wiring 21 and the second inductor wiring 22 unlike the first embodiment. Influences on the mounting area can be reduced by laminating the plurality of inductor wirings in the normal direction. Further, when the laminated inductor wirings are connected in series, the inductance of the inductor array component 1B can be increased.

Specifically, a third inductor wiring 23 is laminated in the normal direction of the first inductor wiring 21, and the first inductor wiring 21 and the third inductor wiring 23 are connected in series. The first inductor wiring 21 and the third inductor wiring 23 are connected in series with an interlayer via conductor 28 interposed therebetween.

The first end 21*a* of the first inductor wiring 21 is electrically connected to the first external terminal 41 on the second main surface 10*b* side with the second vertical wiring 52 below the first end 21*a* interposed therebetween. The second end 21*b* of the first inductor wiring 21 is electrically connected to the second external terminal 42 on the first main surface 10*a* side with the first vertical wiring 51 above the second end 21*b* interposed therebetween and is electrically connected to the second external terminal 42 on the second main surface 10*b* side with the second vertical wiring 52 below the second end 21*b* interposed therebetween.

The third inductor wiring 23 is disposed above the first inductor wiring 21. A first end 23*a* of the third inductor wiring 23 is electrically connected to the first external terminal 41 on the first main surface 10*a* side with the first vertical wiring 51 above the first end 23*a* interposed therebetween. A second end 23*b* of the third inductor wiring 23 is electrically connected to the second external terminal 42 on the first main surface 10*a* side with the first vertical wiring 51 above the second end 23*b* interposed therebetween and is electrically connected to the second external terminal 42 on the second main surface 10*b* side with the second vertical wiring 52 below the second end 23*b* interposed therebetween.

The first end 21*a* of the first inductor wiring 21 and the first end 23*a* of the third inductor wiring 23 are electrically connected to each other with the interlayer via conductor 28 interposed therebetween. Accordingly, the first end 21*a* of the first inductor wiring 21 is electrically connected to the first external terminal 41 on the first main surface 10*a* side with the first vertical wiring 51 above the first end 21*a* interposed therebetween.

A center axis 28*a* of the interlayer via conductor 28 is shifted from each of the center axes 51*a* and 52*a* of the first vertical wiring 51 and the second vertical wiring 52 when viewed from the normal direction (Z direction). With this configuration, it is possible to suppress a recess when the interlayer via conductor 28 is formed, thereby providing the inductor array component 1B having a stable quality.

Although in the above-described embodiment, two inductor wirings are disposed in the Z direction, equal to or more than three inductor wirings of different layers may be disposed in the Z direction. When equal to or more than three inductor wirings of different layers are disposed in the Z direction, a plurality of interlayer via conductors that electrically connects the equal to or more than three inductor wirings is provided. When the inductor array component includes the plurality of interlayer via conductors, a center axis of at least one of the plurality of interlayer via conductors is shifted from each of the center axes of the first vertical wiring and the second vertical wiring when viewed from the normal direction (Z direction).

Fourth Embodiment

Figure 7A:
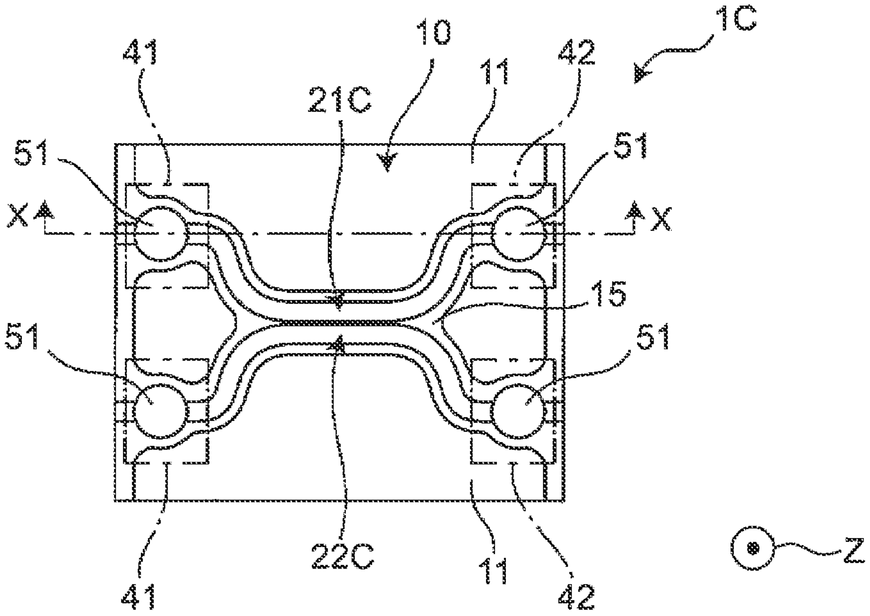
FIG. 7A is a perspective plan view illustrating an inductor array component according to a fourth embodiment.
Figure 7B:
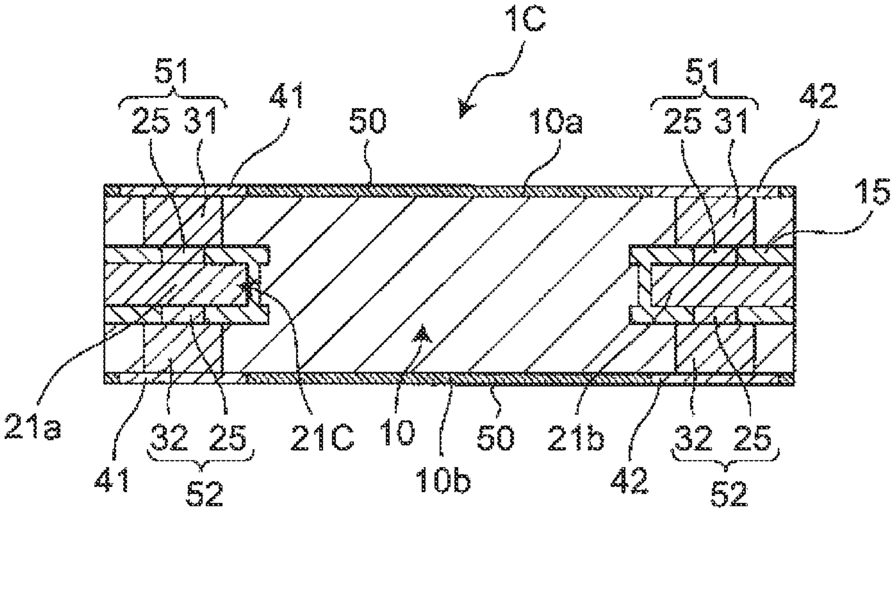
FIG. 7B is a cross-sectional view illustrating the inductor array component according to the fourth embodiment.

FIG. 7A is a perspective plan view illustrating an inductor array component according to a fourth embodiment. FIG. 7B is a cross-sectional view taken along line X-X in FIG. 7A. The fourth embodiment is different from the first embodiment in the configuration of the inductor wirings. This different configuration will be described below. In the fourth embodiment, the same reference numerals as those in the other embodiments denote the same configurations as those in the first embodiment, and description thereof will therefore be omitted.

As illustrated in FIGS. 7A and 7B, an inductor array component 1C according to the fourth embodiment includes, as similar to the inductor array component 1 according to the first embodiment, the vertical wirings 51 and 52 extending in the Z direction from inductor wirings 21C and 22C and penetrating through the inside of the magnetic layer 11. That is, the first vertical wiring 51 and the second vertical wiring 52 are connected to each of the first ends 21*a* and 22*a* of the first and second inductor wirings 21C and 22C, and the first vertical wiring 51 and the second vertical wiring 52 are connected to each of the second ends 21*b* and 22*b* of the first and second inductor wirings 21C and 22C.

In the inductor array component 1C in the fourth embodiment, the first inductor wiring 21C and the second inductor wiring 22C have substantially semi-elliptical arc shapes when viewed in the Z direction. The arcs of the inductor wirings 21C and 22C are formed so as to project in the directions of approaching each other. That is to say, the first and second inductor wirings 21C and 22C are substantially curved wirings wound by about the half of the circumference. Further, the inductor wirings 21C and 22C include straight line parts in middle portions thereof. Note that the first and second inductor wirings 21C and 22C may be substantially curved wirings having less than one turn.

In each of the first and second inductor wirings 21C and 22C, a range surrounded by a curve drawn by the inductor wiring 21C or 22C and a straight line connecting both ends of the inductor wiring 21C or 22C is defined as an inner diameter portion. In this case, the inner diameter portions of the inductor wirings 21C and 22C do not overlap each other when viewed in the Z direction.

On the other hand, the first and second inductor wirings 21C and 22C are in proximity to each other. That is to say, a magnetic flux generated in the first inductor wiring 21C comes around the second inductor wiring 22C in proximity thereto, and a magnetic flux generated in the second inductor wiring 22C comes around the first inductor wiring 21C in proximity thereto. Therefore, magnetism coupling between the first inductor wiring 21C and the second inductor wiring 22C becomes strong.

In the first and second inductor wirings 21C and 22C, when currents flow simultaneously from the first ends 21*a* and 22*a* on the same side toward the second ends 21*b* and 22*b* on the opposite side, the magnetic fluxes intensify each other. This means that the first inductor wiring 21C and the second inductor wiring 22C are positively coupled to each other when both the first ends 21*a* and 22*a* of the first inductor wiring 21C and the second inductor wiring 22C are set to the input side of a pulse signal whereas both the second ends 21*b* and 22*b* thereof are set to the output side of the pulse signal. On the other hand, for example, when the first end 21*a* of the first inductor wiring 21C is set to the input side and the second end 21*b* thereof is set to the output side whereas the first end 22*a* of the second inductor wiring 22C is set to the output side and the second end 22*b* thereof is set to the input side, the first inductor wiring 21C and the second inductor wiring 22C can be made into a state of being negatively coupled to each other.

It is preferable that an average grain diameter of the metal magnetic powder 101 be equal to or more than about 1/30 and equal to or less than about 1/3 (i.e., from about 1/30 to about 1/3) of a maximum distance between the first inductor wiring 21C and the second inductor wiring 22C. According to this, since the average grain diameter of the metal magnetic powder 101 is equal to or more than about 1/30, the average grain diameter of the metal magnetic powder 101 does not become smaller than necessary. Therefore, the magnetic permeability of the inductor array component 1, which can be obtained, can be increased. Further, since the average grain diameter is equal to or less than about 1/3, the metal magnetic powder can be stably filled into between the first inductor wiring 21C and the second inductor wiring 22C. The maximum distance between the first inductor wiring 21C and the second inductor wiring 22C indicates the maximum distance when the first inductor wiring 21C and the second inductor wiring 22C are viewed in the Z direction. Although the first and second inductor wirings 21C and 22C are covered with the insulating layer 15, the thickness of the insulating layer 15 may not be considered because the thickness of the insulating layer 15 is small.

Fifth Embodiment

Figure 8:
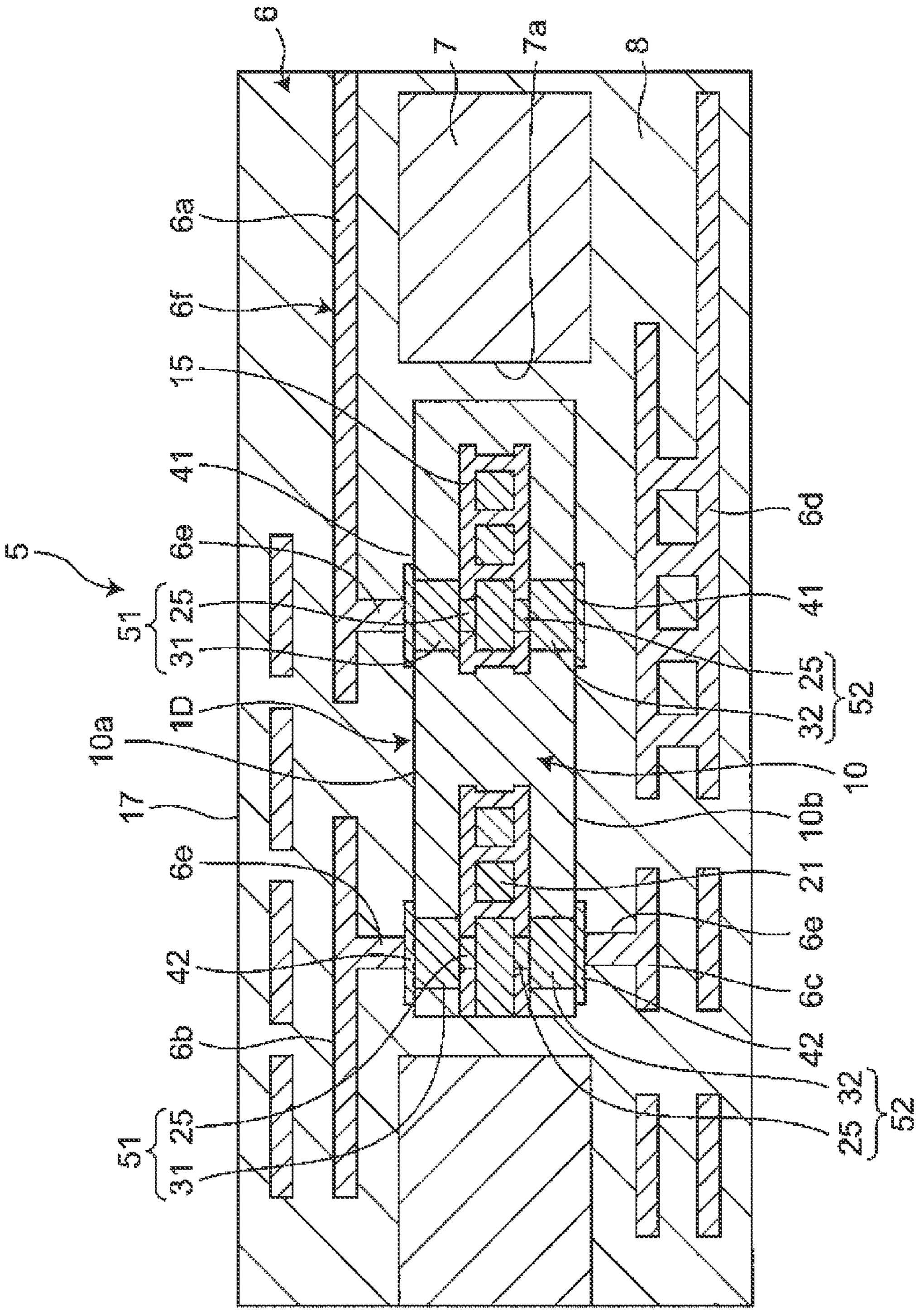
FIG. 8 is a cross-sectional view illustrating an inductor array component built-in substrate according to a fifth embodiment.

FIG. 8 is a cross-sectional view illustrating an inductor array component built-in substrate according to a fifth embodiment. As illustrated in FIG. 8, an inductor array component built-in substrate 5 in the fifth embodiment includes an inductor array component 1D, a substrate 6 in which the inductor array component 1D is embedded, and a substrate wiring 6*f*. The substrate wiring 6*f* includes pattern portions 6*a* to 6*d* extending in the direction along a main surface (a substrate main surface 17) of the substrate 6 and substrate via portions 6*e* extending in the thickness direction of the substrate 6. The substrate wiring 6*f* is connected to the inductor array component 1D in the substrate via portions 6*e*.

The inductor array component 1D is different from the inductor array component 1 in the first embodiment in that the inductor array component 1D does not include the coating film 50. The other configurations thereof are the same as those of the inductor array component 1 in the first embodiment, and description thereof will therefore be omitted.

The substrate 6 includes a core member 7 and an insulating layer 8. The inductor array component 1D is disposed in a through-hole 7*a* of the core member 7 and is covered with the insulating layer 8 together with the core member 7. In the inductor array component 1D, when the main surfaces 10*a* and 10*b* of the main body 10 have irregularities, the insulating layer 8 covers the main surfaces 10*a* and 10*b* having the irregularities. Therefore, close contact between the main surfaces 10*a* and 10*b* and the insulating layer 8 is improved due to the anchor effect.

It is preferable that the main surfaces 10*a* and 10*b* of the main body 10 of the inductor array component 1D be parallel to the substrate main surface 17. When the main surfaces 10*a* and 10*b* of the inductor array component 1D and the substrate main surface 17 are parallel to each other, the inductor array component built-in substrate 5 can be further reduced in thickness. The inductor array component 1D may be embedded in the substrate 6 in a state where the substrate main surface 17, the main surfaces 10*a* and 10*b* of the main body 10, and the plane on which the inductor wirings 21 and 22 are disposed are substantially parallel to one another. In such a case, the Z direction (the normal direction with respect to the plane on which the inductor wirings 21 and 22 are disposed) of the inductor array component 1D substantially coincides with the thickness direction of the substrate 6 and is substantially orthogonal to the substrate main surface 17.

The external terminals 41 and 42 of the inductor array component 1D are directly connected to the substrate via portions 6*e*. That is, the substrate wiring 6*f* is connected to the external terminals 41 and 42 of the inductor array component 1D in the substrate via portions 6*e*. The substrate via portions 6*e* include first via portions connected to the inductor array component 1D from the upper side in the Z direction and a second via portion connected to the inductor array component 1D from the lower side in the Z direction. Specifically, the first external terminal 41 on the upper side is connected to the first pattern portion 6*a* with the substrate via portion 6*e* (first via portion) above the first external terminal 41 interposed therebetween. The second external terminal 42 on the upper side is connected to the second pattern portion 6*b* with the substrate via portion 6*e* (first via portion) above the second external terminal 42 interposed therebetween. The second external terminal 42 on the lower side is connected to the third pattern portion 6*c* with the substrate via portion 6*e* (second via portion) below the second external terminal 42 interposed therebetween. The first external terminal 41 on the lower side is not connected to the fourth pattern portion 6*d* below the first external terminal 41.

Accordingly, since the inductor array component built-in substrate 5 includes the inductor array component 1D, it is possible to improve the degree of freedom in circuit design. It is preferable that the pattern portions 6*a* to 6*d* of the substrate wiring 6*f* be disposed in parallel with the plane on which the inductor wirings 21 and 22 are disposed. With this configuration, the inductor array component built-in substrate 5 can be made thin.

In short, in the inductor array component built-in substrate 5, the inductor wirings 21 and 22 of the inductor array component 1D and the substrate wiring 6*f* are connected to each other by the vertical wirings 51 and 52 and the substrate via portions 6*e* extending in the Z-direction. This means that the inductor wiring 21 and the substrate wiring 6*f* are connected to each other without any extra wiring routing. In the inductor array component built-in substrate 5, it is possible to effectively utilize a space formed by omission of the extra routing. Therefore, the degree of freedom in circuit design can be improved compared to the existing inductor array component and the existing inductor array component built-in substrate.

In addition, in the inductor array component built-in substrate 5, wiring resistance can be reduced because there is no extra wiring routing. Further, in the inductor array component built-in substrate 5, by embedding the relatively large inductor array component 1D in the substrate 6, the overall circuit can be reduced in size and thickness.

The substrate wiring 6*f* is electrically connected to the inductor array component 1D from both sides (upper and lower sides) of the inductor array component 1D in the Z direction. In this case, layout options of the pattern portions 6*a* to 6*d* are increased and the degree of freedom in the circuit design is improved as compared with the existing inductor array component built-in substrate in which the substrate wiring is connected thereto from only one side of the inductor array component 1D.

As described in the first embodiment, in the inductor array component 1D, the areas of the external terminals 41 and 42 are larger than the areas of the columnar wirings 31 and 32 when viewed in the Z direction. Therefore, the areas of the external terminals 41 and 42 can be increased. Accordingly, in embedding of the inductor array component 1D in the substrate 6, when the substrate via portions 6*e* that are connected to the external terminals of the inductor array component 1D are provided in the substrate 6, margins of the formation positions of the substrate via portions 6*e* with respect to the external terminals 41 and 42 can be increased, thereby improving yield in embedding.

Although only the inductor array component 1D and the substrate wiring 6*f* are illustrated in the inductor array component built-in substrate 5 in FIG. 8, another electronic component such as a semiconductor component, a capacitor component, and a resistor component may be embedded in the inductor array component built-in substrate 5. Further, another electronic component may be surface-mounted on the substrate main surface 17 or a semiconductor chip may be joined to the substrate main surface 17. In addition, instead of the inductor array component 1D, the inductor array component according to any of the second to fourth embodiments can be embedded in the inductor array component built-in substrate in the fifth embodiment.

It should be noted that the present disclosure is not limited to the above-described embodiments, and design changes can be made without departing from the scope of the gist of the present disclosure. For example, the feature points of the first to fifth embodiments may be variously combined. In each of the first to sixth embodiments, even when the functions and effects described in another embodiment are not particularly mentioned and description thereof is omitted in the embodiment, if the same configuration is provided in the embodiment, the same functions and effects are basically exhibited in the embodiment.

In the above embodiments, the inductor wirings are substantially spiral wirings. However, the inductor wirings are not limited to those in the above-described embodiments and may have various known structures and shapes such as substantially straight shapes, substantially meander shapes, and substantially helical shapes, for example. That is, the inductor wirings of the present disclosure apply the inductance to the inductor array component by generating magnetic fluxes in the magnetic layer when the current flows therethrough, and there is no particular limitation on the structures, shapes, materials, and the like thereof.

In the above-described embodiments, the inductor wirings are covered with the insulating layer. However, the entire inductor wirings may be in contact with the magnetic layer without providing the insulating layer. The number of inductor wirings can be increased or decreased without departing from the scope of the gist of the present disclosure.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor array component comprising:

a substantially flat plate-shaped magnetic main body;

a first inductor wiring and a second inductor wiring disposed on a same plane in the main body and adjacent to each other;

a plurality of first vertical wirings extending from sides of a first end and a second end of the first inductor wiring and sides of a first end and a second end of the second inductor wiring, respectively, in a first direction of a normal direction with respect to the plane so as to penetrate through inside of the main body and being exposed on a side of a first main surface of the main body; and a plurality of second vertical wirings extending from the sides of the first end and the second end of the first inductor wiring and the sides of the first end and the second end of the second inductor wiring, respectively, in a second direction of the normal direction with respect to the plane so as to penetrate through the inside of the main body and being exposed on a side of a second main surface of the main body, wherein a first pair of one of the plurality of the first vertical wirings and one of the plurality of the second vertical wirings has cross-sectional areas different from each other.

2. The inductor array component according to claim 1, wherein at least one of the first pair of one of the plurality of the first vertical wirings and one of the plurality of the second vertical wirings extending from a first same position of the first inductor wiring or the second inductor wiring and a second pair of one of the plurality of the first vertical wirings and one of the plurality of the second vertical wirings extending from a second same position of the first inductor wiring or the second inductor wiring has a common axis extending in center axes thereof.

3. The inductor array component according to claim 1, further comprising:

a non-magnetic insulating layer covering at least a part of the first inductor wiring and the second inductor wiring.

4. The inductor array component according to claim 3, wherein the insulating layer contains at least one of epoxy-based resin, phenol-based resin, polyimide-based resin, acryl-based resin, and vinyl ether-based resin.

5. The inductor array component according to claim 3, wherein at least one of the plurality of first vertical wirings and the plurality of second vertical wirings includes a via conductor and a columnar wiring, the via conductor extending in the normal direction from the first end or the second end of the first inductor wiring or the second inductor wiring and penetrating through inside of the insulating layer, and the columnar wiring extending in the normal direction from the via conductor and penetrating through inside of the magnetic layer.

6. The inductor array component according to claim 5, wherein in the first pair of one of the plurality of the first vertical wirings and one of the plurality of the second vertical wirings extending from a first same position of the first inductor wiring or the second inductor wiring, one of the first pair includes the via conductor and the columnar wiring and the other of the first pair does not include the via conductor.

7. The inductor array component according to claim 1, wherein a minimum distance of the metal magnetic powder toward the plurality of the first vertical wirings and the second vertical wirings is equal to or less than about 200 nm.

8. The inductor array component according to claim 1, wherein a minimum distance of the metal magnetic powder toward the first inductor wiring and the second inductor wiring is equal to or less than about 200 nm.

9. The inductor array component according to claim 1, wherein the magnetic layer includes a main surface having irregularities and being parallel to the plane, and an arithmetic average roughness $R_a$ of the irregularities of the main surface of the magnetic layer is equal to or less than about 1/10 of a thickness of the magnetic layer.

10. The inductor array component according to claim 1, further comprising:

a coating film provided on a surface of the magnetic layer.

11. The inductor array component according to claim 1, further comprising:

an inductor wiring laminated in the normal direction of the first inductor wiring or the second inductor wiring.

12. The inductor array component according to claim 11, further comprising:

an interlayer via conductor that connects the inductor wiring and the first inductor wiring or the second inductor wiring in the normal direction, wherein a center axis of the interlayer via conductor is shifted from a center axis of each of the first vertical wirings and the second vertical wirings when viewed from the normal direction.

13. The inductor array component according to claim 1, wherein an average grain diameter of the metal magnetic powder is from about 1/30 to about 1/3 of inscribed circles of inner magnetic paths of the first inductor wiring and the second inductor wiring when viewed from the normal direction.

14. The inductor array component according to claim 1, wherein an average grain diameter of the metal magnetic powder is from about 1/30 to about 1/3 of a maximum distance between the first inductor wiring and the second inductor wiring.

15. The inductor array component according to claim 1, wherein an average grain diameter of the metal magnetic powder is from about 1/10 to about 2/3 of a thickness of the magnetic layer.

16. The inductor array component according to claim 1, wherein the magnetic layer further contains ferrite powder.

17. The inductor array component according to claim 1, wherein the magnetic layer contains non-magnetic powder made of an insulating material.

18. An inductor array component built-in substrate comprising:

the inductor array component according to claim 1;

a substrate in which the inductor array component is embedded, and a substrate wiring including a pattern portion extending in a direction along a main surface of the substrate and a substrate via portion extending in a thickness direction of the substrate, wherein the substrate wiring is connected to the inductor array component in the substrate via portion.

19. The inductor array component built-in substrate according to claim 18, wherein the pattern portion of the substrate wiring is disposed in parallel with a plane on which the inductor wirings are disposed.

* * * * *